(12) United States Patent
Bramberger

(10) Patent No.: US 12,084,317 B2
(45) Date of Patent: Sep. 10, 2024

(54) CABLE ROBOT

(71) Applicant: Liebherr-Werk Biberach GmbH, Biberach an der Riss (DE)

(72) Inventor: Robert Bramberger, Biberach an der Riss (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 540 days.

(21) Appl. No.: 17/443,221

(22) Filed: Jul. 22, 2021

(65) Prior Publication Data

US 2021/0347614 A1 Nov. 11, 2021

Related U.S. Application Data

(63) Continuation of application No. PCT/EP2020/050904, filed on Jan. 15, 2020.

(30) Foreign Application Priority Data

Jan. 23, 2019 (DE) ..................... 10 2019 101 623.1

(51) Int. Cl.
*B66C 21/04* (2006.01)
*B25J 9/00* (2006.01)
(Continued)

(52) U.S. Cl.
CPC ............. *B66C 21/04* (2013.01); *B25J 9/0078* (2013.01); *B66C 13/46* (2013.01); *E04G 21/02* (2013.01); *E04G 21/16* (2013.01)

(58) Field of Classification Search
CPC ........ B25J 9/104; B25J 9/0096; B25J 9/0078; B66C 2700/011; B66C 2700/01;
(Continued)

(56) References Cited

U.S. PATENT DOCUMENTS 6,826,452 B1 11/2004 Holland et al.
2003/0168647 A1 9/2003 Thompson et al.
(Continued)

FOREIGN PATENT DOCUMENTS

CN 103831819 6/2014
CN 104196073 12/2014
(Continued)

OTHER PUBLICATIONS

Wehr, Martin, "Beitrag zur Untersuchung von hochfesten synthetischen Faserseilen unter hochdy-namischer Beanspruchung", Institute for Materials Handling and Logistics, University of Stuttgart, May 2017.

*Primary Examiner* — Stella K Yi
(74) *Attorney, Agent, or Firm* — Levine Bagade Han LLP

(57) ABSTRACT

The invention relates to a cable robot for creating a structure or manipulating a workpiece, comprising a working head which is suspended on a support structure having at least three support columns by a system of cables having at least three control cables, wherein cable winches are provided for adjusting the control cables relative to the support structure and/or relative to the working head, and they can be actuated by an electronic control device for moving the working head, wherein the support columns of the support structure are luffingly and/or telescopically arranged on a revolving stage, which has a ballast weight for absorbing a tilting moment introduced into the respective support column by the system of cables and which is arranged on an undercarriage such that it can rotate about an upright revolving stage axis, said undercarriage having a chassis and being configured such that it can move with the revolving stage and the downwardly luffing and/or retracted support column.

20 Claims, 2 Drawing Sheets

(51) Int. Cl.
  *B66C 13/46*    (2006.01)
  *E04G 21/02*    (2006.01)
  *E04G 21/16*    (2006.01)

(58) Field of Classification Search
  CPC ......... B66C 23/12; B66C 21/04; B66C 21/02; B66C 21/00
  See application file for complete search history.

(56) References Cited

U.S. PATENT DOCUMENTS

| | | |
|---|---|---|
| 2015/0217975 A1 | 8/2015 | Khajepour et al. |
| 2018/0231100 A1 | 8/2018 | Khajepour et al. |

FOREIGN PATENT DOCUMENTS

| | | | |
|---|---|---|---|
| CN | 109072621 | | 12/2018 |
| DE | 102009050729 | * | 10/2009 |
| DE | 102014015335 | | 8/2016 |
| EP | 3392404 | * | 10/2018 |
| KR | 20120057185 | | 6/2012 |
| WO | WO 2017/174201 | | 10/2017 |
| WO | WO 2020/152007 | | 7/2020 |

* cited by examiner

CABLE ROBOT

CROSS-REFERENCE TO RELATED APPLICATIONS

This application is a continuation of International Patent Application Number PCT/EP2020/050904 filed Jan. 15, 2020, which claims priority to German Patent Application Number DE 10 2019 101 623.1 filed Jan. 23, 2019, both of which are incorporated herein by reference in their entireties.

BACKGROUND

The invention relates to a cable robot for creating a structure and/or manipulating a workpiece, comprising a working head which is suspended on a support structure having at least three support columns by a system of cables having at least three control cables, wherein cable winches are provided for adjusting the control cables relative to the support structure and/or relative to the working head, and they can be actuated by an electronic control device for moving the working head.

What is typically referred to as cable robots are manipulators that do not use stiff or rigid connection members, crane booms or arms as movement-transmitting components, such as for example jointed arm robots, but that use flexible transmission elements for force transmission instead. Such flexible transmission elements in the form of cables, in particular steel or fiber cables, are usually guided from various articulation points on a support structure to a working head, which is supported by the tensioned cables. By lowering or retracting the cables using the cable winches, which can be adjusted on the support structure at said articulation points or positioned elsewhere and can retract the cable via one or more pulley blocks, the system of cables can be adjusted relative to the support structure and therefore the working head can be moved. If necessary, the system of cables can also be adjusted relative to the working head, for example by a cable winch provided on the working head, such as a capstan winch. Through coordinated lowering and retracting of the ropes, for example synchronously to one another or in opposite directions to one another, the working head can be selectively moved in the vertical direction and/or in the horizontal direction.

Through the application of such an adjustable system of cables, the working space or area that can be operated by the working head can be almost indefinitely expanded and, in particular, can be much more extensive than that of conventional jointed arm or gantry robots. At the same time, it is possible to achieve very high speeds and accelerations, as the ropes enable high travel speeds.

Due to the very large working area, such cable robots are used, for example, to move television or video cameras in sports stadiums or also at construction sites in order to erect a larger structure, such as a house or parts thereof, or to transport materials for this purpose. Drawing inspiration from the 3D printing technology, it is known, for example, that a shotcrete application head can be moved as a working head on such a cable robot in order to produce a shotcrete contour, or to place prefabricated components with pinpoint accuracy in order to erect a wall or building wall, cf. Christian K. Karl et al. "*Industrie 4.0 in der Bauwirtschaft-Einfluss der automatisierten Gebäudeerstellung auf die gewerbliche Berufsbildung*", University of Cologne, 2017. In principle, however, such cable robots can also be used in manufacturing industries such as steel construction plants, wind turbine manufacturers or shipyards to produce or handle larger structures or workpieces. However, due to the cable elongation and, in some cases, very long transmission paths, cable robots have, at least until now, been used rather scarcely for highly accurate positioning tasks.

In order to save weight in very long system of cables, it has already been suggested that instead of steel ropes, there could be used high-strength fiber ropes, which consist of or may have high-strength synthetic fibers such as aramid fibers (HMPA), aramid/carbon fiber mixtures, high-modulus polyethylene fibers (HMPE), or poly(p-phenylene-2,6-benzobisoxazole) fibers (PBO). The payload or the permitted lifting load can be increased due to the weight savings with respect to steel ropes of up to 80% with almost the same break strength since the rope's own weight, that is to be taken into account for the payload, is considerably smaller. In addition to the savings in construction weight, the masses to be moved are also reduced, resulting in a further increase in the working load. Furthermore, the fiber rope arrangement is less susceptible to interference from wind-induced transverse oscillations, as is the case, for example, with cables that are under tension in bridge construction.

In addition to said weight advantages, rope drives with synthetic fiber ropes are characterized by a considerably longer service life, easier handling, and good flexibility, as well as eliminating the need for rope lubrication.

The use of such high-strength fiber ropes on a cable robot can be seen, for example, in the "*Beitrag zur Untersuchung von hochfesten synthetischen Faserseilen unter hochdynamischer Beanspruchung*" by Martin Wehr in reports from the Institute for Materials Handling and Logistics, University of Stuttgart, May 2017. The prior art document WO 2017/174201 A1 also describes a cable robot for the control cables of which there are proposed high-strength fiber cables comprising synthetic fibers such as polyester, said cable robot being intended to carry a shotcrete head by means of which sprayable concrete is to be applied and as a result building walls are to be additively erected. The control cables are lowered or retracted by means of winches, which are attached to a rectangular, gantry-like support structure.

A similar cable robot for the construction of shotcrete walls is shown in DE 10 2014 015 335 B4, in accordance with which as a support structure there is used a plurality of separate support columns, which are configured so that they can be handled in a mobile manner. Specifically, four lattice structure columns are mounted at the corners of a rectangular construction site. From each of the lattice structure columns, two cables are lowered to the working head, which are diverted via pulley blocks in the upper area of the lattice structure columns and wound onto rope drums at the base area of the columns.

Such cable robots, nevertheless, which can actually cover larger working areas and can also be used for construction sites or the erection of buildings, for example, require effort and are difficult to be set up and assembled at the jobsite or to be dismantled. On the one hand, the support structure or parts thereof can no longer be easily transported due to the corresponding dimensions. On the other hand, considerable set-up times are required to assemble the support structure and align its parts with one another.

There is also the problem that the accuracy with which the working head can be positioned quickly suffers considerably if the control cable articulation points have even minor deviations from their nominal positions as a result of inaccuracies or alignment errors when mounting the support structure, which can result, for example, from slight tilting or inaccuracies in the spacing of the support columns from one another. Due to the inclined orientation of the control cables, positioning errors of the articulation points have a strong effect, for example, with regard to the height position of the working head. At the same time, travel paths of the working head that are predetermined by the control device, for example straight travel paths, can become distorted if the position of the articulation points does not correspond exactly to the grid specified for this purpose.

It is therefore the underlying object of the present invention to provide an improved cable robot of the initially named kind which avoids disadvantages of the prior art and further develops the latter in an advantageous manner. In particular, the aim is to create a cable robot that is easy to transport, has a large working area, and although it is simple and quick to assemble and disassemble, it achieves high positioning accuracy when moving the working head.

SUMMARY

Said task is solved, according to the invention, with a cable robot as claimed in claim 1. Preferred embodiments of the invention are the subject-matter of the dependent claims.

It is therefore suggested that the support columns of the support structure be configured separately from one another as mobile units and be arranged on an undercarriage that can be moved and which also serves as a support base for erecting the support columns. According to the invention the support columns are luffingly and/or telescopically and/or foldingly arranged on a revolving stage, which has a ballast weight for absorbing a tilting moment introduced into the respective support column by the system of cables and which is arranged on an undercarriage such that it can rotate about an upright revolving stage axis, said undercarriage having a chassis and being configured such that it can move with the revolving stage and the downwardly luffing and/or retracted and/or foldable support column for transport position. In this way, the support columns do not need to be mounted on a separate foundation, but can be moved on the undercarriage to the required assembly site, where they can be erected on the undercarriage into the working position.

In this case, the respective support column can be easily aligned by turning the revolving stage relative to the other support columns and/or according to the required course of the system of cables, wherein the ballast mounted on the revolving stage can compensate for or absorb the tilting moment that is introduced into the support column by the system of cables.

Advantageously, the system of cables in this case comprises a high-strength fiber rope, which may consist of high-strength synthetic fibers such as aramid fibers (HMPA), aramid/carbon fiber mixtures, high-modulus polyethylene fibers (HMPE), or poly(p-phenylene-2,6-benzobisoxazole) fibers (PBO), or may at least comprise such fibers. The use of such high-strength fiber ropes not only reduces the weight of the system of cables itself but also facilitates a reduction in the construction weights of the components that is loaded with and the masses moved, which on the one hand leads to an increase in the working load of the application and on the other hand, above all, makes it easier to comply with the axle loads permissible for road transport even in the case of a smaller number of axles. At the same time, the positioning accuracy of the working head can be improved by the low elongation of such fiber parts. In addition, the fibre rope is less susceptible to interference from wind-induced transverse oscillations, so that when the weather conditions are not always perfect, out in the open, the working head can be positioned with greater precision.

In order to easily erect the support columns on the respective revolving stages or to move them from a reduced transport position into an intended working position, the revolving stages can each have an externally powered luffing drive for luffing the support columns up and down from a lying-down transport position into the upright working position and vice versa. Such a luffing drive can in particular have one or also a plurality of luffing cylinders that are connected in parallel, for example in the form of a hydraulic cylinder, which can engage on the one hand with the revolving stage and on the other hand with the support column. The support column can be hinged to the revolving stage with a foot piece so that it can luff about a horizontal luffing axis.

In order to be able to reduce the length of the support column for transport with little assembly or disassembly effort, the support columns can each comprise several column portions that can be retracted and extended relative to one another and/or foldable and expandable. In this context, column portions that can be extended and retracted can also be combined with one or more foldable column portions, e.g. in such a way that at least one further column portion can be extended from a hinged portion that is luffingly hinged to the revolving stage, which in turn supports a further load-bearing column portion in a foldable manner. If foldable column portions are present, a folding drive, for example in the form of a pressure medium cylinder, can be assigned to them for folding and/or unfolding. In the unfolded working position, the supporting column portions can extend along a common longitudinal column axis or coaxially thereto.

The telescoping drive for extending and/or retracting can be, for example, a telescoping cylinder inside the corresponding telescopic portions and/or a cable drive.

An advantageous further development of the invention is that the support structure for tensioning or hinging the system of cables by means of which the working head is suspended can comprise at least one crane which, in addition to its function as a part of the support structure, can also be configured to function independently as a crane. In particular, a revolving tower crane, especially in the form of a bottom-slewer, can be used as a support structure part, wherein said revolving tower crane can have a crane boom for its function as a crane or lifting device in a manner known per se, from which a lifting cable with a lifting hook can extend. The crane boom can be a horizontal boom or a luffing boom, wherein the hoist cable can advantageously extend over a trolley which can be moved along the boom.

For its function as a support structure part, an articulation point for a control cable of the cable robot can be provided on the tower of the revolving tower crane, for example by a pulley block in an upper portion of the tower and/or by a cable winch, which can be mounted in an upper portion of the tower. Advantageously, several articulation points for several control cables can also be attached to the tower of the revolving tower crane, for example in the form of pulley blocks offset higher or lower relative to one another, via which the control cables are diverted to cable winches at the base area of the tower. The tower of the crane can therefore form a support column for the system of cables. Alternatively or additionally, an articulation point for the system of cables can also be mounted on the boom of the crane.

The use of such a revolving tower crane as a support structure part, from which at least one control cable of the cable robot extends, smaller lifting or conveying tasks can be taken over before the assembly of the cable robot or after the disassembly of the cable robot, if required also with the cable robot assembled. In particular, the crane can be used for the assembly of the cable robot or the disassembly of the cable robot, for example for attaching or removing the working head. The crane can also be used to convey material to the construction site, or to perform other lifting tasks typical to construction sites.

Advantageously, said revolving tower crane is configured as a mobile crane, the tower of which is arranged on a revolving stage which is rotatably mounted about an upright axis on an undercarriage which has a chassis and advantageously has its own travel drive in order to be self-driving. Advantageously, a ballast weight for absorbing tipping moments is provided on the superstructure or the revolving stage to which the tower is hinged, which rotates with the revolving stage and balances the crane independently of its rotational position.

Said crane can be used in addition to the aforementioned three support columns, so that the system of cables can be tensioned from four articulation points. If three articulation points are sufficient, said crane can also form one of said at least three support columns, and conversely more than four articulation points are also possible.

Advantageously, the above-mentioned at least three support columns are also arranged on undercarriages, each with its own travel drive for driving at least one trolley axle, so that the support columns are also configured to be self-driving. In particular, the undercarriages of the support columns and of the crane can each be configured as a truck which has at least one steerable chassis axle which can be turned from a driver's cab or from a driver's station, at which driver's station the further control pedals and levers for the chassis drive can also be mounted.

The control device, which moves the working head in the required manner and for this purpose actuates the cable winches, by means of which the cables of the system of cables are adjusted, can in principle be structured in different ways, wherein advantageously said control device is of electronic design and in particular can have a microprocessor, which can process a control programme, which can be stored in a memory device. The control device can automatically or semi-automatically follow a predetermined travel path of the working head, for example a straight, horizontal path or an ascending or descending curved movement, which can be specified, for example, on the basis of a BIM model. Alternatively or additionally, the control device can also react to input commands from a machine operator and convert these into a corresponding positioning movement of the working head by the control device converting the input commands, for example tilting or moving a joystick in a given direction, into corresponding rotary movements of the cable winches.

Said control device can have a modular design, in particular have a local control device on each of the mobile units comprising a support column with at least one cable winch or configured as a crane, which controls the at least one cable winch and/or monitors the load or the tilting moment acting on the respective unit and, if necessary, shuts down the installation if there is a risk of a movement or load that could endanger the stability.

In order to harmonise and coordinate the cable movements on the various support columns or the at least one crane, the control device can further comprise a superordinate control unit, which can be electronically configured in said manner and can comprise a microprocessor, program memory and other components, said superordinate control unit being able to communicate with the local control devices in order to control and operate the respective cable winches in a harmonised manner via said local control units in order to achieve cable movements that are harmonised in the required manner.

Said superordinate control unit can be formed by one of the local control units, which forms a master unit, thus monitoring and/or controlling the other local control units. As an alternative to such a modular control architecture, however, there can also be used a central control device which directly controls the cable winches at the individual units.

In a further development of the invention, said control device comprises an adaptation or correction module which, in order to generate a required travel path of the working head, adapts and corrects the travel commands for the individual rope winches if the positions and/or orientations of the support columns or support structure parts and the articulation points provided thereon for the ropes of the system of cables deviate from an inherently predetermined set-up pattern. For example, the control device can determine the positioning movements, in particular positioning speeds and accelerations and positioning paths of the individual cable winches for a specific travel path of the working head on the assumption that the articulation points of the cables of the system of cables define exactly a predetermined rectangle of predetermined dimensions—or, in the case of several control cables running diagonally upwards and diagonally downwards, define several such rectangles lying one above another. If the quadrilateral of the articulation points of the system of cables actually spanned by the supporting columns and, if applicable, by said crane, deviates from the dimensions of the predetermined rectangle, or if the defined rectangle does not lie exactly in a horizontal plane, for example because the various supporting columns have been erected on a sloping or inclined construction site, the rectangle must be defined by the crane. If the defined rectangle is not exactly in a horizontal plane, for example because the various support columns have been erected on an inclined site or the predetermined distances between the support columns have not been exactly maintained, the control device corrects the control commands for the winch operation with the aid of said adaptation and/or correction module in order to correct or compensate for the positional errors of the articulation points.

The exact positions or distances of the support columns from one another can, for example, be entered manually into the control device, for which the control device can have a corresponding input interface, for example in the form of a touch screen. Advantageously, however, the control device comprises a sensor device that determines the actual positions of the support columns and/or the articulation points of the ropes of the system of cables relative to one another and feeds or provides them to the control device or to said adaptation and/or correction unit. Such a sensor device can, for example, comprise absolute position sensors, which can, for example, be configured as GPS sensors in order to precisely determine the absolute position of the individual support columns.

In order to be able to accurately detect even minor positional or alignment errors, said sensor device can advantageously comprise relative sensors that detect the position of the support columns and/or the articulation points attached thereto for the system of cables relative to one another and/or relative to a predetermined ambient point of the installation environment, the sensor system can comprise distance sensors for detecting the relative distance of a respective support column from one or more other support columns and/or from a predetermined ambient point, so that the control device knows exactly the relative distance of the support columns from one another. Such a distance sensor can be, for example, a laser measuring device that measures the distance to further support columns and/or from a predetermined ambient point.

Advantageously, said distance sensors operate in a horizontal plane in order to determine the horizontal distance of the support columns or the articulation points attached to them from one another.

In order to also be able to detect positional errors in the vertical direction, for example as a result of an inclined construction site, said sensor device can advantageously also comprise level sensors which can measure the height position of a respective support column relative to one or more other support columns and/or relative to the level of a predetermined ambient point which functions as zero level. Such a level sensor for determining the relative height offset between two support columns or cable linkage points can also be configured in a fundamentally different way, for example, it can work according to the triangulation method and/or comprise an optical, in particular laser sensor, which locates or detects a specific point on the other support column and/or an ambient point.

BRIEF DESCRIPTION OF THE DRAWINGS

The invention is explained in more detail below on the basis of a preferred exemplary embodiment and the corresponding drawings. The drawings show.

DETAILED DESCRIPTION

As shown in the figures, the cable robot 1 comprises a system of cables 2 spanned by a support structure 3 and supporting a working head 4.

Said working head 4 can be differently configured and/or equipped with different working tools, for example in the form of a material application head such as a concrete spraying head or another manufacturing tool and/or in the form of a workpiece gripper or another handling tool such as a clamshell grabs.

Figure 1:
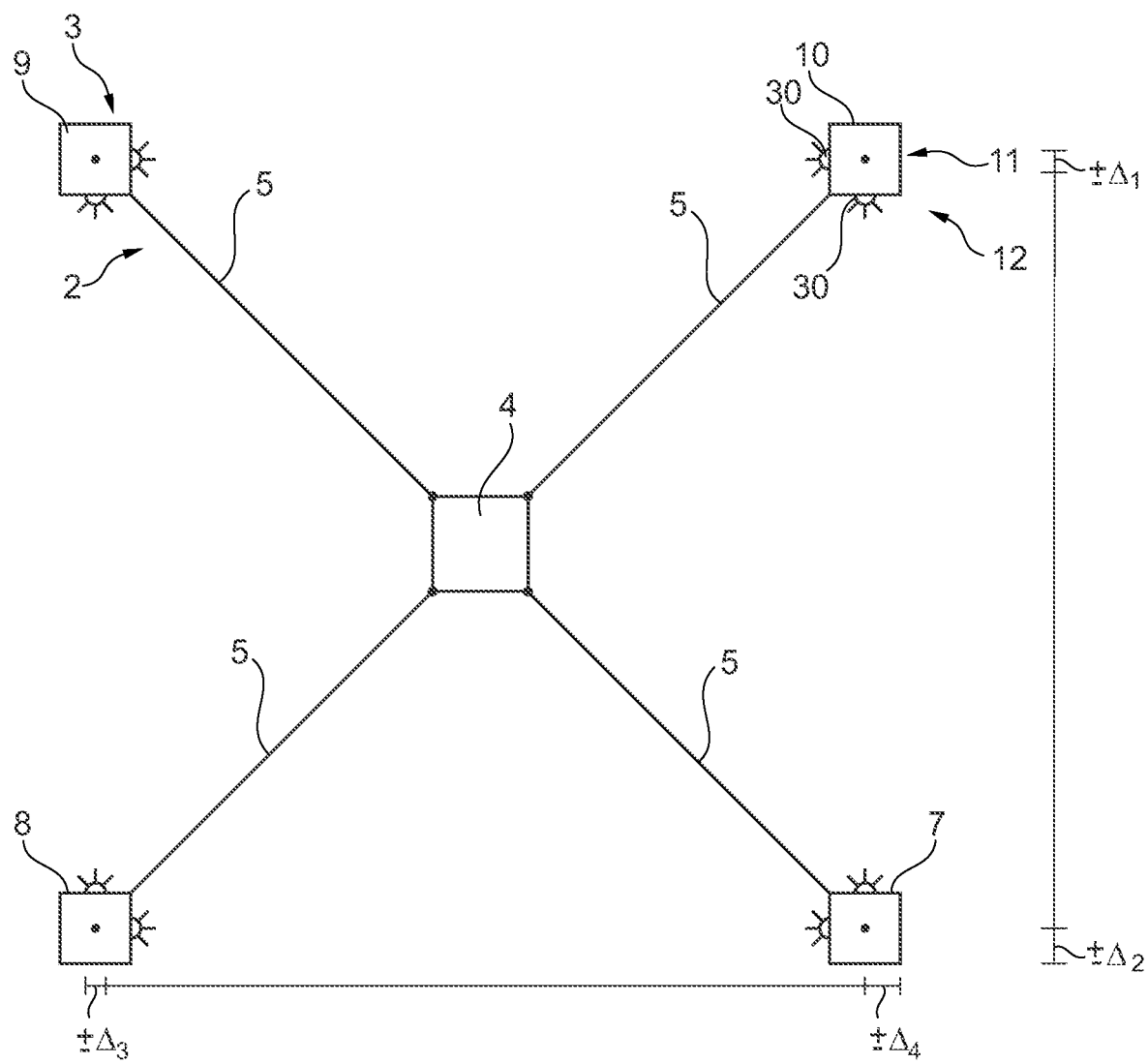
FIG. 1: a top view of a cable robot according to an advantageous embodiment of the invention, according to which the support structure for the system of cables of the cable robot has a plurality of vehicle units which can be moved independently, some of which are configured as mobile support column units and at least one of which is configured as a mobile crane.
Figure 2:
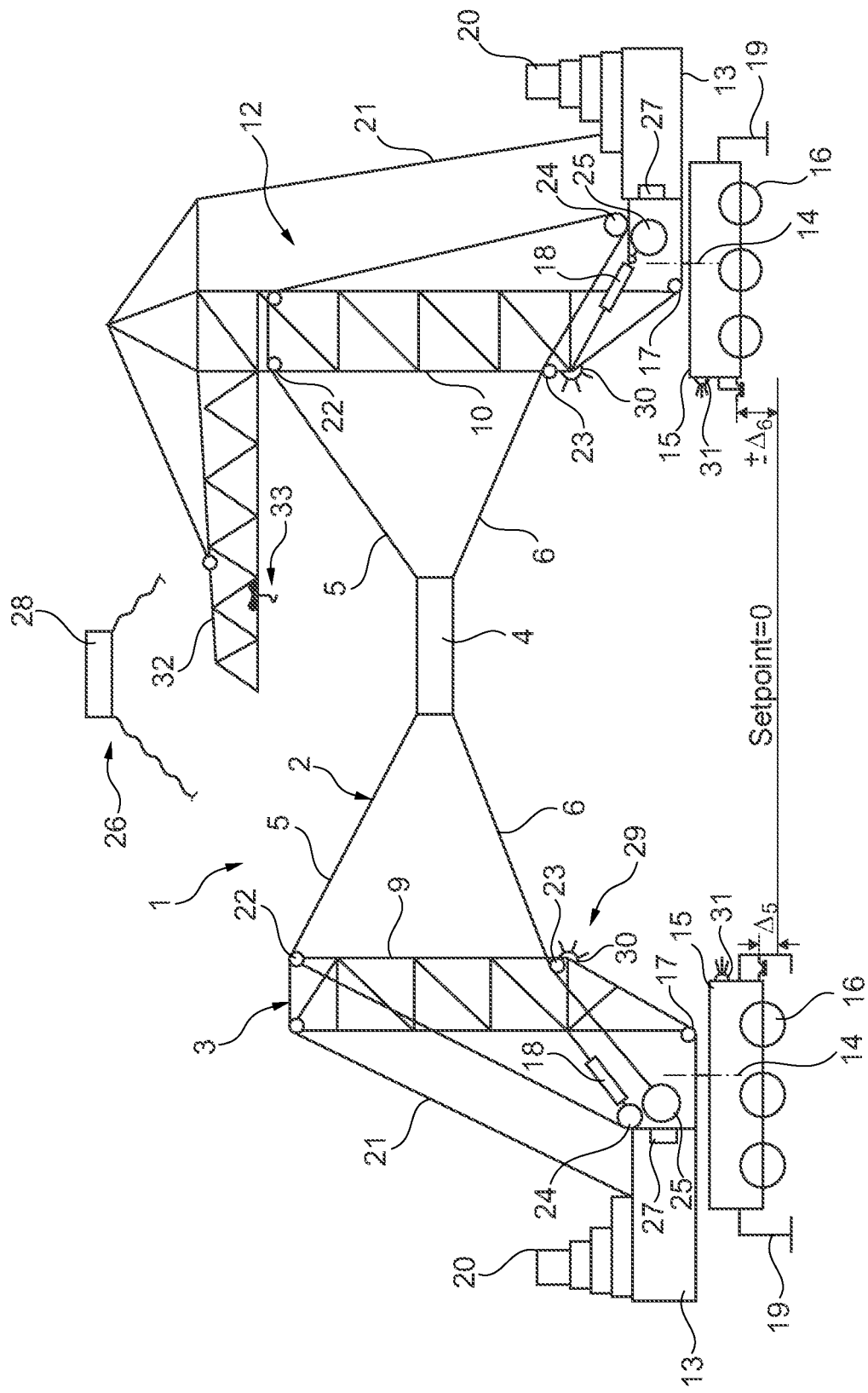
FIG. 2: a side view of the cable robot from FIG. 1, showing a support column and the crane, to each of which the system of cables is hinged with two control cables, which have articulation points on the column or the crane tower that are offset higher or lower from one another and can each be retracted and lowered by a cable winch.

As shown in FIG. 1, the system of cables 2 can comprise cables extending in four cardinal directions or in four different vertical planes, wherein advantageously two cables 5, 6 can be provided for each cardinal direction or each vertical plane, which can run from articulation points arranged at different heights, in particular can guide the working head 4 once diagonally upwards and once diagonally downwards, cf. FIG. 2.

In particular, the support structure may comprise four separate support columns 7, 8, 9 and 10, each upright, at least one of which may be formed by the tower 11 of a revolving tower crane 12.

Advantageously, said support columns 7, 8, 9 and 10 including the tower 11 of the revolving tower crane 12 are each formed part of a mobile unit that can be moved independently, so that the support columns 7, 8, 9 and 10 can be moved and transported independently of one another.

The support columns 7, 8, 9 and 10 or the tower 11 of the crane 12 can be mounted on a revolving stage 13, which is rotatably arranged on an undercarriage 15 around an upright revolving stage axis 14. A rotary drive that is not particularly shown, for example comprising a sprocket and a drive gear meshing therewith, can rotate the revolving stage 14 relative to the undercarriage 15.

Said undercarriage 15 comprises a chassis 16 which may have several chassis axles, at least one of which may be configured to be steerable and at least one of which may be drivable. A travel drive for driving the at least one chassis axle can comprise, for example, an engine or an electric motor or a mixed form in the form of a hybrid drive. In particular, the undercarriage 15 may form a truck suitable for road use, supporting said revolving stage 13 and steerable and controllable from a driver's cab. During operation at the construction site, the undercarriage 15 can be supported on the ground by extendable supporting foot 19, wherein, advantageously, an uneven ground can be balanced and/or an exactly horizontal position of the undercarriage 15 can be achieved by extending the supporting foot 19 to different extents.

The support columns 7, 8, 9 and 10 or the tower 11 of the crane 12 are advantageously hinged to said revolving stage 13 so as to be able to luff about a horizontal luffing axis 17 in the base area of the respective support column or tower in order to be able to be switched from the upright working position shown in FIG. 2 to a horizontal transport position. The luffing up and down can be carried out by means of a luffing drive 18, for example in the form of hydraulic cylinders.

Depending on the height or length of the support columns 7, 8, 9 and 10 or the tower 11, it may be necessary or helpful to be able to fold and/or retract the support columns for the transport position. For this purpose, the support columns or the tower can be composed of a plurality of column portions that can be folded or retracted relative to one another about a transverse axis, which can be power-operated by means of a folding drive or a telescoping drive.

As FIG. 2 further shows, the revolving stage 13 of the mobile units can each carry a ballast weight 20 that absorbs or compensates for tilting moments that are introduced from the system of cables 2 via the support columns 7, 8, 9 and 10 or the tower 11. The support columns 7, 8, 9 and 10 or the tower 11 are held in the upright working position by said luffing drive and/or additionally by a guying 21 which tensions the respective support column or tower to the revolving stage 13, cf. FIG. 2. The ballast weight 20 absorbs tilting moments introduced via said guying 21 and/or the luffing drive.

As FIG. 2 shows, each support column 7, 8, 9 and 10 or the tower 11 of the crane 12 can have an articulation point for an upper control cable 5 in an upper end portion and a lower articulation point 23 for the lower control cable 6 in a lower portion, in particular in a base portion, wherein said upper and lower articulation points 22 and 23 can be formed by pulley blocks which divert the respective control cable 5 or 6 and lead to a respective cable winch 24 or 25, by means of which the control cables 5 and 6 of each mobile unit can be adjusted independently of one another, whilst still being coordinated with one another. As FIG. 2 shows, said articulation points 22 and 23 can be sufficiently offset higher or lower from one another so that the working head 4 is fixed or guided by the control cables 5 and 6 both upwards and downwards. Nevertheless, it would also be possible to introduce both control cables from above.

Due to the different heights of the control cables 5 and 6 on the working head 4, cf. FIG. 2, the working head 4 can be guided exactly in its alignment.

For moving and/or positioning the working head 4, an electronic control device 26 is provided which can control the cable winches 24 and 25 on each mobile column unit and thus the retracting or easing of the control cables 5 and 6. Advantageously, a local control unit 27 can be provided on each mobile column or crane unit, which can control the cable winches 24 and 25 on the respective mobile unit, wherein the local control unit 27 can be configured electronically in each case, for example can comprise a microprocessor and a programme memory, in order to process a control routine in the form of a software programme. Advantageously, said local control unit 27 not only controls the winches 24 and 25, but also performs load monitoring. In particular, the local control unit 27 can comprise a load monitoring module which monitors the tilting moment introduced into the mobile column unit and compares it with a maximum tilting moment. For this purpose, said load monitoring unit can, for example, monitor the cable tension of the two control cables 5 and 6 and, if necessary, their extension angle or inclination angle in order to determine from this the current tilting moment introduced into the support column, which can then be compared with the permissible tilting moment. When the permissible tipping moment is reached or exceeded, the control unit can, for example, switch off the winch drives.

In order to coordinate the winch movements of the various mobile column units with one another, said control device 26 advantageously comprises a superior or central control unit 28 which can communicate with the several local control units 27, as explained at the beginning. In particular, said plurality of local control units 27 can carry out control commands from said central control unit 28 for the winch movements of said winches 24 and 25 and/or report back the detected winch movements to said central control unit 28 in order to coordinate the control cables 5 and 6 of said plurality of mobile support column units so as to move the working head 4 in the required manner.

Advantageously, said control device 26 comprises a sensor system by means of which the position of the plurality of support columns including the tower relative to one another as well as their orientation and height offset relative to one another can be determined. In particular, a sensor device 29 may comprise distance sensors 30, for example in the form of laser measuring devices, each of which may measure the distance of a support column 7, 8, 9 and 10 or of the tower 11 from the respective adjacent support columns, said distance sensors 30 being able to determine the horizontal distance between the support columns. As FIG. 1 shows, the control device 26 can determine deviations $\Delta_1$, $\Delta_2$, $\Delta_3$ ... $\Delta_n$ from the measured distances, which respectively indicate the deviation of the actual installation location of the respective support column from a predetermined installation location and/or from the predetermined spacing of the support columns from one another. If the required set-up arrangement of the support columns is in itself a rectangle or square with a predetermined edge length, said deviation $\Delta_1$, $\Delta_2$ ... $\Delta_n$ can, for example, indicate the deviation from the respective corner point of the rectangle or square in the direction of a longitudinal edge and/or indicate the deviation of the distance from the predetermined edge length.

Similarly, the sensor device 29 can also detect the height offset of the support columns or their installation locations. For this purpose, the sensor device 29 can comprise height sensors 31 on the respective mobile units, which can detect the height position of a support column or, for example, of the undercarriage connected thereto or of the revolving stage connected thereto relative to another mobile unit. Alternatively or additionally, the height sensors 31 can also determine the height position of the respective mobile unit relative to a predetermined zero level, which can be, for example, a specific, stationary point of the installation environment, in particular in the area of the working field over which the working head 4 travels. For example, the centre of the working field over which the cable robot 1 travels can be selected as the zero level relative to which said height sensors 31 detect the respective height position of the respective mobile unit. Said height sensors 31 can comprise, for example, laser measuring devices that can operate according to the triangulation principle.

As FIG. 2 shows, the height sensors 31 can in particular determine the height offset $\Delta_1, \Delta_2 \ldots \Delta_5, \Delta_6$ of the respective mobile unit relative to the zero level.

On the basis of the distance and height offset data determined by the sensor device 29, the control device 26, in particular an adaptation and/or correction module, which can be configured in the form of a software module, can correct the control commands for moving the cable winches 24 and 25 in order to achieve the required positioning and/or the required travel path of the working head 4. The control device 26 can itself start from a predefined set-up matrix, for example an exactly horizontally aligned square of the articulation points of the system of cables, and calculate correction factors on the basis of the sensor-detected distance and/or height offset data, with the aid of which the control commands are then adapted to the actual set-up safety.

We claim:

1. A cable robot for creating a structure or manipulating a workpiece, comprising:
    a working head suspended on a support structure having at least three support columns by a system of cables having at least three control cables;
    cable winches for adjusting the at least three control cables relative to the support structure and/or relative to the working head, wherein the cable winches are configured to be actuated by an electronic control device for moving the working head; and
    a luffing drive comprising at least one luffing cylinder, wherein the at least three support columns of the support structure are luffingly arranged on a revolving stage such that each of the at least three support columns is pivotable at one end about a horizontal axis such that each of the at least three support columns has a lying-down transport position and an upright working position, wherein each of the at least three support columns is pivotable from the lying-down transport position to the upright working position, wherein each of the at least three support columns is pivotable from the upright working position to the lying-down transport position, wherein the luffing drive is on the revolving stage for luffing each of the at least three support columns into the upright working position from the lying-down transport position, wherein the revolving stage has a ballast weight for absorbing a tilting moment introduced into the respective support column by the system of cables, wherein the revolving stage is arranged on an undercarriage such that the ballast weight can rotate about an upright revolving stage axis, wherein the undercarriage comprises a chassis and is configured so the undercarriage can move with the revolving stage and the at least three support columns when in a retracted configuration, wherein at least one of the at least three support columns comprises a tower of a revolving tower crane, wherein the revolving tower crane supports a crane boom from which a hoist cable with a lifting hook extends, wherein a trolley over which a hoisting rope extends is mounted on the crane boom so as to be movable, wherein the revolving tower crane is configured as a bottom-slewer, wherein the tower of the revolving tower crane is mounted with a tower lower end portion on the revolving stage, wherein the luffing drive is configured to luff the tower of the revolving tower crane relative to the revolving stage, wherein the tower of the revolving tower crane is configured to revolve about the upright revolving stage axis together with the revolving stage, wherein the revolving tower crane is configured as a mobile crane, wherein the tower of the revolving tower crane is mounted on the undercarriage having the chassis which can be moved together with the tower of the revolving tower crane.

2. The cable robot of claim 1, wherein the undercarriage comprises a travel drive for driving at least one chassis axle, and wherein the travel drive comprises an engine and/or an electric motor, and at least one steerable chassis axle.

3. The cable robot of claim 1, wherein the at least three control cables are configured as high-strength fibre ropes comprising synthetic fibres.

4. The cable robot of claim 1, wherein the electronic control device comprises:
 a sensor device for detecting positions and/or orientations of the at least three support columns and/or articulation points provided thereon for the system of cables relative to one another, and
 an adaptation and/or correction module for adapting and/or correcting control commands for adjustment of the cable winches as a function of the detected positions and/or orientations of the at least three support columns and/or the articulation points provided thereon relative to one another.

5. The cable robot of claim 4, wherein the sensor device comprises distance sensors for detecting a horizontal distance of the at least three support columns relative to one another and/or relative to a predetermined ambient point, and wherein the adjustment and/or correction module of the electronic control device adjusts and/or corrects the control commands for the winch adjustment on the basis of the detected horizontal distances.

6. The cable robot of claim 5, wherein the sensor device comprises height sensors for determining the height position of the at least three support columns and/or the articulation points for the system of columns relative to one another and/or relative to the level of a predetermined ambient point, and wherein the adaptation and/or correction module of the electronic control device is configured to carry out the control commands for the winch adjustment of the cable winches as a function of the determined height positions of the at least three support columns and/or of the articulation points mounted thereon.

7. The cable robot of claim 1, wherein the electronic control device comprises a central control unit which communicates with local control units on mobile support column units and is configured to control the cable winches on the mobile support column units, wherein the central control unit provides the local control units with desired values for cable adjustment and/or winch adjustment.

8. The cable robot of claim 1, further comprising two articulation points on each of the at least three support columns for articulation of two control cables, wherein the two articulation points are offset in height from one another so the two control cables on the respective support column extend in a common upright plane offset in height from one another relative to the working head.

9. The cable robot of claim 8, wherein the two articulation points are arranged in upper and lower end portions of the respective support column so that one of the two control cables pulls the working head upwards and the other of the two control cables pulls the working head downwards.

10. The cable robot of claim 1, wherein the at least three control cables on the at least three support columns are diverted at articulation points therein by cable pulleys and guided to the cable winches, wherein the cable winches are in the area of the column base and/or on the revolving stage.

11. The cable robot of claim 1, wherein the at least three support columns are supported exclusively on the revolving stage and/or are configured to be free of ground bracing anchored in the ground.

12. The cable robot of claim 1, wherein the system of cables is spanned by three support columns and a tower of a revolving tower crane.

13. The cable robot of claim 7, wherein the control device comprises a monitoring module for monitoring the stability of mobile support column units, wherein the monitoring module is configured to monitor a respective tilting moment which is introduced by the system of cables via a respective support column into the respective mobile support column unit and to compare it with a permissible tilting moment.

14. A cable robot for creating a structure or manipulating a workpiece, comprising:
 a working head suspended on a support structure having at least three support columns by a system of cables having at least three control cables; and
 cable winches for adjusting the at least three control cables relative to the support structure and/or relative to the working head, wherein the cable winches are configured to be actuated by an electronic control device for moving the working head, wherein the at least three support columns of the support structure are luffingly and/or telescopically arranged on a revolving stage which has a ballast weight for absorbing a tilting moment introduced into the respective support column by the system of cables and which is arranged on an undercarriage such that the ballast weight can rotate about an upright revolving stage axis, wherein the undercarriage comprises a chassis and is configured so the undercarriage can move with the revolving stage and the at least three support columns when in a retracted configuration,
 wherein the electronic control device comprises a central control unit which communicates with local control units on mobile support column units and is configured to control the cable winches on the mobile support column units, wherein the central control unit provides the local control units with desired values for cable adjustment and/or winch adjustment,
 wherein the control device comprises a monitoring module for monitoring the stability of the mobile support column units, wherein the monitoring module is configured to monitor a respective tilting moment which is introduced by the system of cables via a respective support column into the respective mobile support column unit and to compare it with a permissible tilting moment.

15. The cable robot of claim 14, further comprising a luffing drive on the revolving stage for luffing each of the at least three support columns up into an upright working position from a lying-down transport position, and wherein the luffing drive comprises at least one luffing cylinder.

16. The cable robot of claim 15, wherein a telescoping and/or folding drive for extending and/or unfolding column portions into a working position of bigger column length from a transport position of smaller column length is associated in each case with each of the at least three support columns, each of the at least three support columns comprising a plurality of column portions.

17. The cable robot of claim 14, wherein at least one of the at least three support columns comprises a tower of a revolving tower crane, wherein the revolving tower crane supports a crane boom from which a hoist cable with a lifting hook extends, wherein a trolley over which a hoisting rope extends is mounted on the crane boom so as to be movable.

18. The cable robot of claim 17, wherein the revolving tower crane is configured as a bottom-slewer, wherein the tower of the revolving tower crane is mounted with a tower lower end portion on the revolving stage.

19. The cable robot of claim 17, wherein the revolving tower crane is configured as a mobile crane, wherein the tower of the revolving tower crane is mounted on the undercarriage having the chassis which can be moved together with the tower of the revolving tower crane.

20. The cable robot of claim 14, wherein the monitoring module is integrated in a decentralised manner into the respective local control units of the individual mobile support column units.

* * * * *